March 8, 1960

L. PÈRAS 2,927,474

AUTOMATIC CONTROL DEVICE FOR GEARBOXES, MORE
PARTICULARLY IN A VEHICLE

Filed April 12, 1955

United States Patent Office 2,927,474
Patented Mar. 8, 1960

2,927,474

AUTOMATIC CONTROL DEVICE FOR GEAR-BOXES, MORE PARTICULARLY IN A VEHICLE

Lucien Perà, Billancourt, France, assignor to Regie Nationale des Usines Renault, Billancourt, France Application April 12, 1955, Serial No. 500,976

Claims priority, application France June 21, 1954

13 Claims. (Cl. 74—472)

This invention relates to an automatic control arrangement for variable speed gear boxes, particularly for vehicles and for similar purposes.

In automatic gearboxes with stepped ratios for vehicles, changes from one ratio to another are usually controlled by the action of a device which causes a number of variables to come into action, the chief of said variables being the speed of rotation of a shaft (generally the output shaft of the gearbox) and the load on the engine by the direct action of the torque provided by the latter or by the action of its induction pressure or by the position of the power-regulating member.)

An electrical embodiment of this kind of device is known wherein a D.C. or A.C. generator of the "tachymetric" type is driven by the shaft whose rotational speed is intended to be used as a basis for the operation of the device. This generator provides current as a function of the speed of this shaft, and causes gear changing either directly or by means of one or more relays. The auxiliary variables, especially the load on the engine, influence the moment of changing gear by means of ancillary devices, such for example as rheostats inserted in the circuit. The disadvantage of this embodiment is the high price of the generator.

There are, moreover, appliances for measuring rotational speeds of shafts in which the mean intensity of a current in pulses is measured, said current being obtained by feeding into the circuit of the measuring apparatus energy from a previously charged condenser each time contact is made by a contact-breaker controlled by a cam attached to the shaft whereof the rotational speed is to be measured. The mean current in the measuring circuit is proportional to the number of contacts per unit of time. The application of this principle to engine speed regulators is also known.

The object of the present invention is a gear-change control device in an automatic gearbox for a vehicle wherein the rotational speed of the shaft upon which the moment of operation of the device is to depend acts through a system of contacts operated by this shaft and feeding a succession of pulses into a circuit, the energy of each pulse being substantially constant. The mean current in the circuit is thus substantially proportional to the number of contacts per unit of time, and consequently to the rotational speed of the shaft. The other variables, such as the load on the engine, can be introduced not only by rheostats in the same way as in known devices having a tachymetric generator, but also by causing the supply voltage to vary.

Several forms of embodiment of the invention will now be described by way of example and with reference to the attached drawing, wherein.

Figure 1:
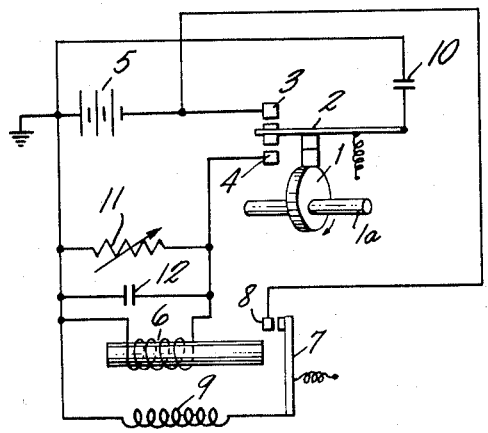
Fig. 1 represents the circuit of a device according to the invention using a changeover contact breaker and a capacity.

In Fig. 1, a cam 1 is attached to the driven shaft 1a, and is here represented as giving one change-over per revolution, but could give several; 2 is the moving blade of a contact breaker of which 3 and 4 are the fixed contacts. 5 is the voltage source (accumulator battery of the vehicle for example), 6 is the winding of a control relay whereof 7 is the moving blade and 8 the fixed contact, 9 is the winding of the device effecting the gear change, 10 a fixed "reservoir" condenser, 11 a rheostat connected to the accelerator (load factor), 12 an auxiliary capacity which may be added if desired to damp the current pulses flowing through the relay 6.

The operation of this device is easily understood. When the shaft 1a turns the cam 1 lifts the insulated blade 2, which comes into contact with the contact 3. The condenser 10 is thus connected to the battery 5, and is charged up. The rotation of the cam then causes the blade 2 to move away from the contact 3, and then to touch the fixed contact 4, and the condenser 10 discharges into the circuit comprising the winding 6, the rheostat 11 and the capacity 12. The mean current flowing in this circuit 6 will be a function of the number of movements of the blade per unit of time, that is to say of the rotational speed of the shaft. The rheostat 11 allows a variable fraction of this current to be diverted, and thus to alter, as a function of load, the mean current flowing in the winding 6, and consequently the speed at which the relay pulls in and causes a change of gear.

Figure 2:
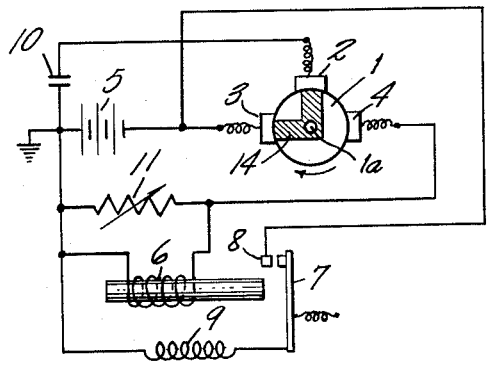
Fig. 2 represents the circuit of another device according to the invention, using a three-brush commutator and a capacity.

The device represented in Fig. 2 is similar to the foregoing, but in this embodiment sliding contacts are used.

In this case, the shaft carries a commutator 1 carrying one or more conductive angle members 14 which cause the condenser 10 successively to be charged up across the battery 5 and to discharge into the winding 6 and the rheostat 11.

Figure 3:
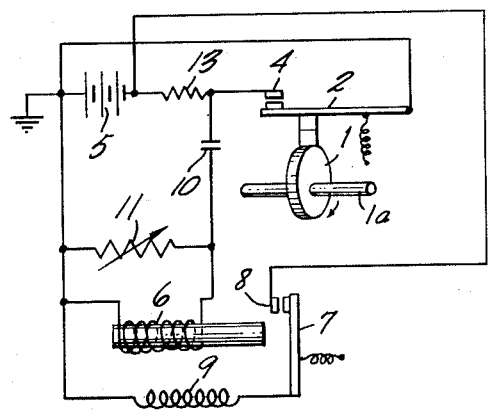
Fig. 3 represents the circuit of another device according to the invention, using a simple contact breaker and a capacity.

In the device represented in Fig. 3 the contact 3 is omitted; the condenser is permanently connected to the battery via a resistance 13 which in this case is in series with the relay winding 6 and the rheostat 11.

When the contact breaker is open the condenser is charged up via the resistance 13 on the one hand and the winding 6 and the rheostat 11 on the other hand. When the contacts close under the influence of the cam, the condenser discharges through 11 and 6. As opposed to the foregoing cases, the current flowing in the relay circulates in both directions alternately, which may lead, for example to the use of a polarised relay or a relay having a low-remanence core.

In another variant, not shown, the contact breaker controlled by the shaft can be constructed in known manner and in such a way as to establish contact for a given and constant time. In this case the contact breaker is simply disposed between the battery and the relay, and there is no need to use a condenser, and the mean current in the circuit is substantially proportional, as in the foregoing cases, to the number of contacts per unit of time.

Figure 4:
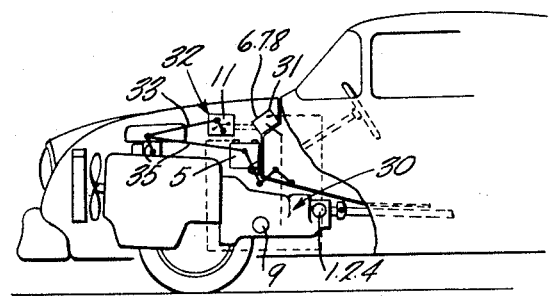
Fig. 4 is a diagrammatic representation of the manner in which the present invention is mounted in a vehicle.

As shown in Fig. 4 the invention is easily mounted in a vehicle. Thus, the make-break switch is mounted adjacent the output shaft of the gear box 30. The relay 6 and its associated condensers are mounted in an enclosure 31 and variable resistance 11 is mounted in an enclosure 32. A link 33 connects the resistance 11 with the throttle control 35 of the vehicle. The manner in which battery 5 is connected to the various elements and to the device 9 actuating the gear box is clearly shown.

While preferred embodiments of the invention have

I claim:

1. In a power transmission system having an engine, electrically actuated means to change gear ratios and having a driven shaft, throttle control means for controlling the speed of the engine, a non-rotary source of direct current, an automatic control arrangement comprising in combination current-responsive means for opening and closing a circuit being adapted to close the circuit at selected mean current values, said current-responsive means being connected between the source of current and the electrical means, electrical connections between the source of current the current-responsive means and said electrically actuated means, means operable by said driven shaft selectively opening and closing the electrical connections between the source of current and the current-responsive means as a function of the speed of said driven shaft, whereby said current-responsive means is selectively energized by pulsating direct current the mean value of which is proportional to the speed of the driven shaft so as to permit energization of said electrically actuated means as a function of the speed of rotation of the driven shaft.

2. In a power transmission system in accordance with claim 1, including capacitance means connected to said means operable by said driven shaft so as to be intermittently charged by said source of current and later permitted to discharge and energize said current-responsive means when discharging.

3. An automatic change speed gear box control arrangement in accordance with claim 1, further including other capacitance means connected so as to damp the pulsating direct current energizing said current-responsive means.

4. In a power transmission system in accordance with claim 1, in which said current-responsive means comprises at least one relay.

5. In a power transmission system in accordance with claim 1, in which the current responsive means comprises a plurality of relays.

6. In a power transmission system having an engine, electrically actuated means and having a driven shaft, throttle control means for controlling the speed of the engine, and a battery, an automatic control arrangement comprising in combination, a switch connected to said battery, said switch having a movable contact and at least one fixed contact, means operable by said driven shaft actuating said switch by intermittently moving said movable contact into and out of engagement with said fixed contact, capacitance means connected to said switch and said battery so as to be charged and discharged depending upon the position of said movable contact, current-responsive means connected to said switch and said battery, said current-responsive means being operable at selected current values and intermittently energized when said capacitance means discharges, electrical connections between the battery, the current-responsive means and said electrically actuated means, whereby the mean current value of the pulsating direct current energizing said current-responsive make-break means is proportional to the speed of rotation of said driven shaft actuating the switch.

7. In a power transmission system in accordance with claim 6, in which said current-responsive means has at least one winding connected to said battery and to said capacitance means and further including a variable resistance in parallel with the winding and operably connected to said throttle control, whereby the mean value of the pulsating direct current energizing the winding is varied as a function of the load on said engine.

8. In a power transmission system in accordance with claim 6, in which said capacitance means has at least two connections one of which is connected to the battery and the fixed contact and the other is connected to said winding, whereby said capacitance means is permitted to discharge in both directions and said current-responsive means is polarized.

9. In a power transmission system in accordance with claim 8, further including a resistance connected between the battery and the capacitance means.

10. In a power transmission system having an engine, comprising, electrically actuated means to change gear ratios having a driven shaft, throttle control means for controlling the speed of the engine, a non-rotary source of direct current, an arrangement comprising in combination, current-responsive means operable at selected current values for opening and closing a circuit, said current-responsive means being connected to control energization of said current actuated means to change gear ratios at said selected current values, electrical connections between the source of current, the current-responsive means and the electrically actuated means to change gear ratios, means operable by said shaft for opening and closing the electrical connections between the source of current and the current-responsive means as a function of the speed of rotation of said driven shaft, whereby said current-responsive means is energized by pulsating direct current the mean value of which is proportional to the speed of the driven shaft so as to permit energization of said electrically actuated means as a function of the speed of rotation of the driven shaft.

11. In a power transmission system in accordance with claim 10, further including means for varying the mean value of the pulsating direct current energizing the current-responsive means as a function of the speed of the engine, whereby the speed of the driven shaft at which the electrically actuated means is varied as a function of the engine speed.

12. In a power transmission system in accordance with claim 11, in which said means for varying the mean value of the pulsating direct current energizing said current-responsive means is operably connected to said throttle control means.

13. In a power transmission system in accordance with claim 11, in which the current-responsive means is a relay having an operating winding, and in which the means for varying the mean value of the pulsating direct current energizing the current-responsive means comprises at least one variable resistance connected across said winding.

References Cited in the file of this patent

FOREIGN PATENTS

| | | |
|---|---|---|
| 452,990 | Germany | Nov. 26, 1927 |
| 459,718 | Great Britain | Jan. 8, 1937 |
| 598,605 | Great Britain | Feb. 23, 1948 |
| 1,010,963 | France | Apr. 2, 1952 |

UNITED STATES PATENT OFFICE

CERTIFICATE OF CORRECTION

Patent No. 2,927,474                                  March 8, 1960

Lucien Peras

It is hereby certified that error appears in the above numbered patent requiring correction and that the said Letters Patent should read as corrected below.

In the grant, line 1, and in the heading to the printed specification, line 4, name of inventor, for "Lucien Pera", each occurrence, read -- Lucien Peras --.

Signed and sealed this 9th day of August 1960.

(SEAL)
Attest:

KARL H. AXLINE                                           ROBERT C. WATSON
Attesting Officer                                    Commissioner of Patents